United States Patent [19]

Lang

[11] 3,952,974

[45] Apr. 27, 1976

[54] CARGO-HANDLING SYSTEM FOR STANDARD BODY AIRPLANES

[75] Inventor: John M. Lang, Bellevue, Wash.

[73] Assignee: The Boeing Company, Seattle, Wash.

[22] Filed: Dec. 20, 1974

[21] Appl. No.: 534,829

[52] U.S. Cl. ..................... 244/137 R; 214/75 T; 214/672
[51] Int. Cl.² ........................................ B64D 9/00
[58] Field of Search ............... 244/137 R, 118 R; 214/75 R, 75 T, 660, 670, 671, 672, 673, 674

[56] References Cited
UNITED STATES PATENTS

| | | | |
|---|---|---|---|
| 2,110,239 | 3/1938 | Richter | 214/75 T |
| 2,442,549 | 6/1948 | Pearlman | 214/75 T |
| 2,536,080 | 1/1951 | Patton | 214/75 T |
| 2,701,068 | 2/1955 | Douglas et al. | 214/75 R |
| 2,732,087 | 1/1956 | Pratt | 214/75 R |
| 3,478,904 | 11/1969 | Courter | 244/137 R X |
| 3,747,782 | 7/1973 | Brown | 214/75 T |
| 3,776,492 | 12/1973 | Iben | 244/137 R |
| 3,861,542 | 1/1975 | Molter et al. | 244/137 R X |

Primary Examiner—Trygve M. Blix
Assistant Examiner—Galen L. Barefoot
Attorney, Agent, or Firm—Christensen, O'Connor, Garrison & Havelka

[57] ABSTRACT

A cargo-handling apparatus which includes a cargo platform for airplanes which is structurally configured to prevent swaying of the cargo platform during loading and unloading of cargo from an aircraft. A pair of braced channel members are provided, which in their operative position extend vertically downward from both sides of the cargo hold of the aircraft, with a cargo platform positioned therebetween. The channel members are braced against movement by a pair of jury struts which extend between each channel member and the body of the aircraft, and a pair of cross braces extending between the channel members. The cargo platform moves up and down between and is guided by the channel members under the control of a power drive unit. The jury struts are disconnectable from the aircraft, and the combination of the jury struts, the braced channel members and the cargo platform is foldable such that the combination is stowable just inside the cargo hold door.

14 Claims, 4 Drawing Figures

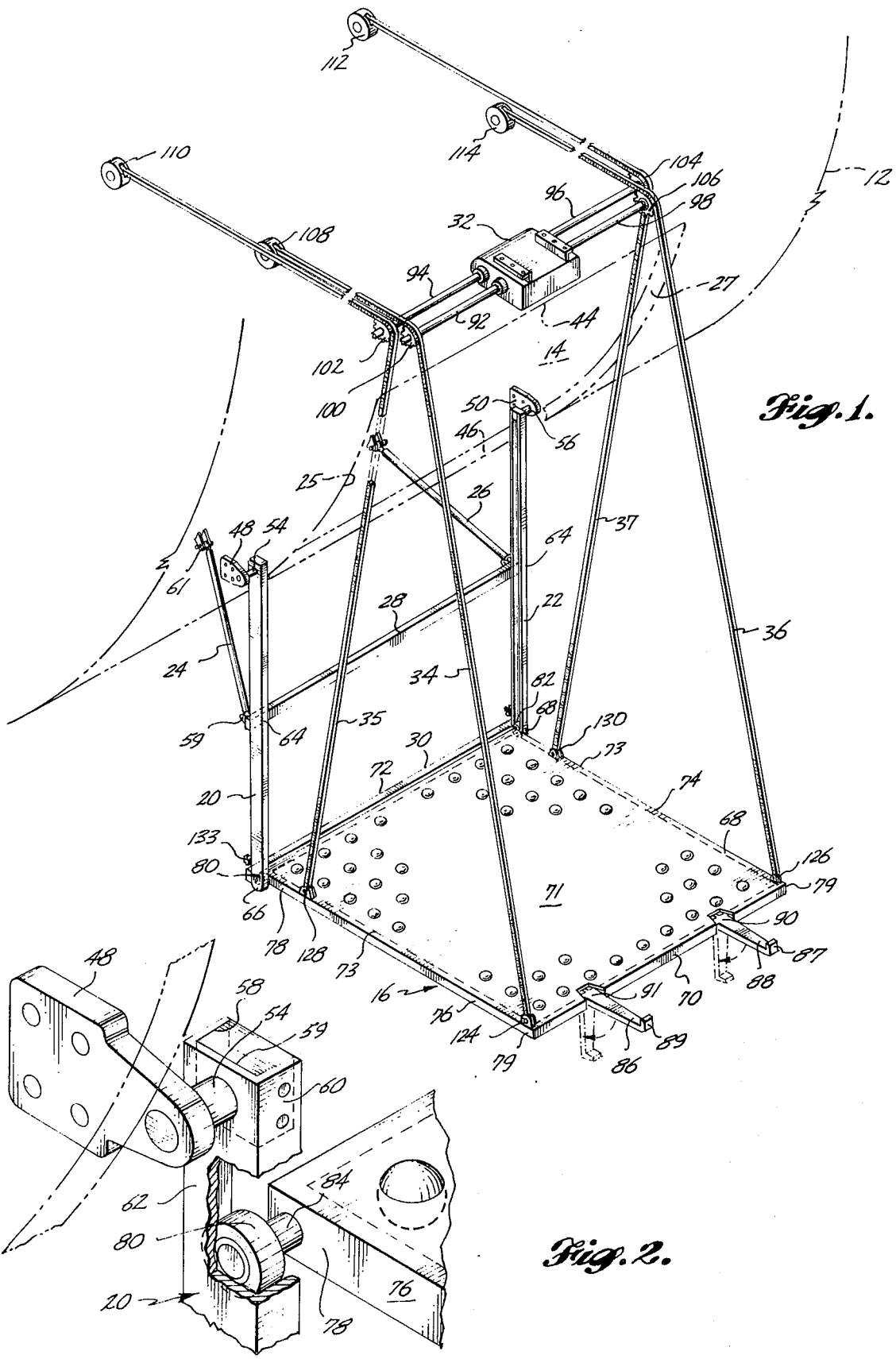

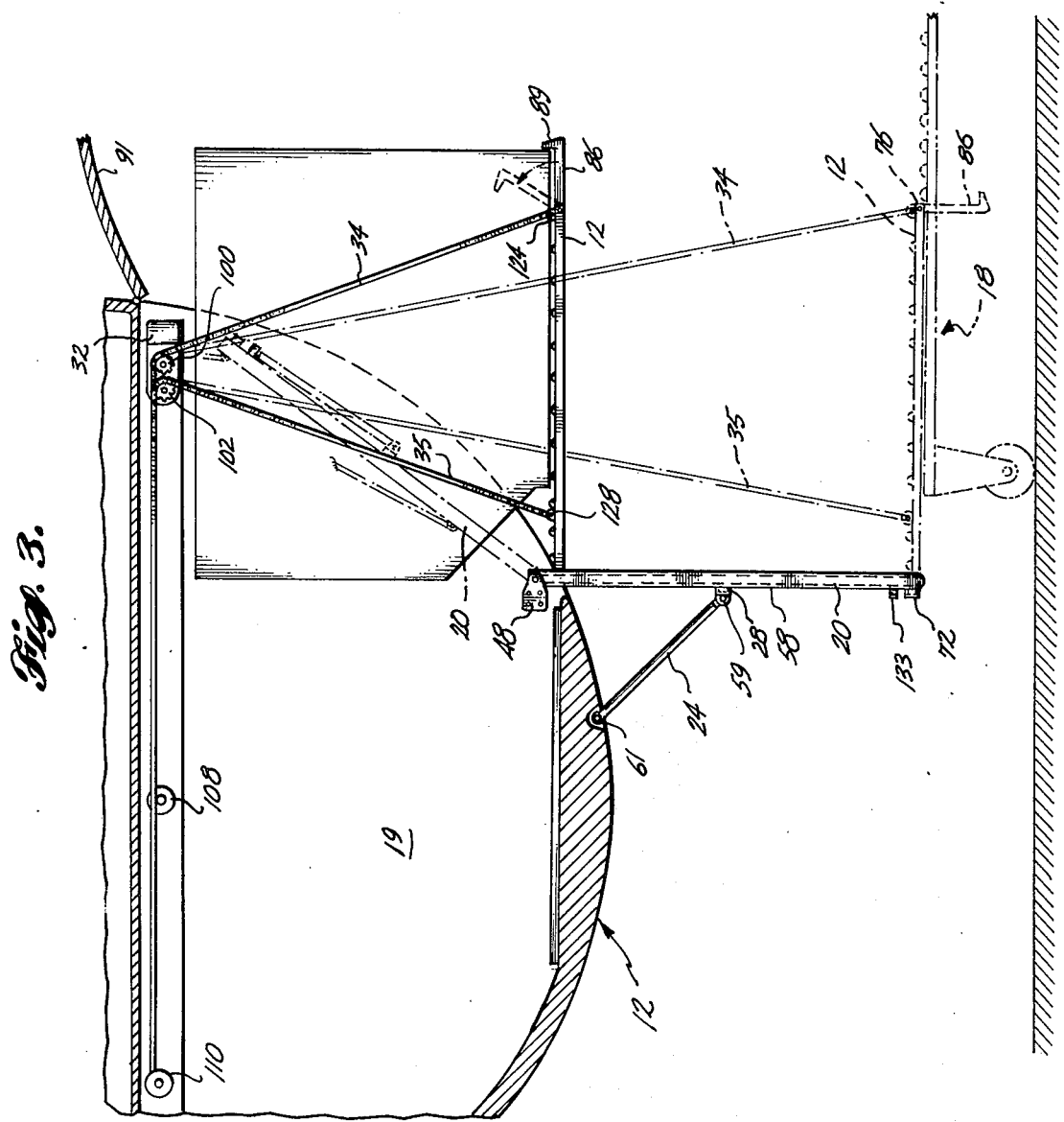

CARGO-HANDLING SYSTEM FOR STANDARD BODY AIRPLANES

BACKGROUND OF THE INVENTION

The present invention relates generally to cargo-handling apparatus, and more specifically concerns the art of airplane cargo-handling apparatus. A significant problem in aircraft cargo operations concerns the loading and unloading of cargo at those destinations which have no powered ground-based cargo-handling equipment which elevate between the ground and the cargo hold of the aircraft. At most of the major airports in the world and certain other aircraft destinations, equipment is available which can be elevated to the height of the cargo hold to permit convenient loading and unloading of cargo between the aircraft and the ground installation.

However, there are many destinations which do not have such specialized equipment, but which have only ground-based cargo-handling equipment which moves the cargo at ground level only between the ground installation and the aircraft. To move cargo from such equipment into and out of the aircraft typically requires some type of on-board cargo-handling apparatus which elevates and lowers the cargo between the cargo hold of the aircraft and the ground equipment. Typically such an apparatus is conveniently stowable within the aircraft during flight, and then deployed at the destination to handle the movement of cargo between the aircraft and the ground installation. Examples of such on-board cargo-handling apparatus are disclosed in U.S. Pat. No. 3,478,904 to Courter, and U.S. Pat. No. 3,463,334 to Blakely et al.

Typically, however, as demonstrated by the above patents, such a mechanism is often complex and bulky as well as expensive, and thus there is a continuing need for a simple, inexpensive on-board apparatus which can efficiently load and unload cargo. Simplified cargo-handling systems have been developed, but it has been discovered that such systems are particularly vulnerable to swaying and twisting to such an extreme that cargo-handling operations become difficult, cumbersome, and in some cases dangerous. Thus, on-board cargo-handling apparatus should be sufficiently stable to resist swaying and twisting during cargo-handling operations.

In view of the above, it is a general object of the present invention to overcome the disadvantages of the prior art discussed above.

It is another object of the present invention to provide a cargo-handling apparatus which is simple in construction and which resists swaying and/or twisting during cargo-handling operations.

It is another object of the present invention to provide such a cargo-handling apparatus which is stowable on board the aircraft during flight.

It is a further object of the present invention to provide such a cargo-handling apparatus which includes a cargo platform which is power driven.

It is yet another object of the present invention to provide such a cargo-handling apparatus which uses a portion of the aircraft body for bracing of the apparatus against swaying and/or twisting thereof.

SUMMARY OF THE INVENTION

Accordingly, the present invention, which is suitable for use in airplanes for moving cargo between ground level equipment such as a cart and a cargo hold opening in the airplane, includes a cargo platform on which the cargo to be so moved is supported, and further includes guiding means which extend from the cargo hold opening to a termination point above ground level for guiding the cargo platform as it is moved between the termination point, where cargo is loaded from the ground-based equipment to the cargo platform, to the cargo hold opening, with the guiding means being adapted so as to be stowable with the cargo platform within the airplane during flight. Means are also provided for moving the cargo platform between the termination point and the cargo hold opening, as well as stabilizing means extending between, and rigidly bracing the guiding means to the aircraft body when the cargo-handling apparatus is deployed, with the stabilizing means acting to stabilize the guiding means against substantial movement during loading and unloading of cargo.

More specifically, the stabilizing means is arranged relative to the guiding means and to the aircraft in such a way as to provide substantial stabilization of the guiding means against movement. For instance, the stabilizing means is connected to the body of the aircraft at a point which is spaced substantially away from the cargo hold opening, and in one embodiment, stabilizing means slant toward one another from their originating points on the guiding means to their termination points on the body of the aircraft. Furthermore, in a preferred embodiment, the stabilizing means is connected to the guiding means at a point which is at least midway along the length of said guiding means between the cargo hold opening and the termination point of the guiding means.

DESCRIPTION OF THE DRAWINGS

FIG. 1 is an isometric view of the apparatus of the present invention showing it in a fully deployed position relative to the hold of an aircraft.

FIG. 2 is a partially cut-away isometric view showing the manner in which the cargo platform mates with the channel members for movement therein.

FIG. 3 is a side elevational view showing the cargo-handling apparatus of the present invention in various positions relative to the hold of an aircraft, which is shown in cross-section.

FIG. 4 is a partial side elevation view of the cargo-handling apparatus relative to the hold of an aircraft which is shown partially in cross-section, with the cargo-handling apparatus being shown in a fully stowed position inside the aircraft hold.

DESCRIPTION OF THE PREFERRED EMBODIMENT

Referring to FIG. 1, a section of an aircraft shown generally at 12 is provided with an opening 14 to the cargo hold, thereby permitting movement of cargo between the aircraft hold and the ground installation. The apparatus of the present invention is shown in its fully deployed configuration in FIG. 1, with a cargo platform 16 being positioned at the very bottom of the vertically deployed channel members 20 and 22. When so deployed, channel members 20 and 22 are braced against swaying and twisting by jury struts 24 and 26, which extend from the channel members 20 and 22, respectively, to the body of the aircraft 12. Braces 28 and 30 extend directly between the two channel members 20 and 22 and provide additional structural integrity and strength for the cargo apparatus. A conventional drive unit 32 is secured inside the aircraft to a support member (not shown) with the drive unit 32 supplying power through drive chains 34, 35, 36 and 37 to raise and lower the cargo platform 16 in the channel members 20 and 22.

Referring specifically now to FIG. 3, the apparatus of the present invention in operation has three principal positions. When the apparatus is fully deployed, the cargo platform 16 is movable between two positions, one being the lowermost position relative to channel members 20 and 22, shown in dashed lines in FIG. 3, a position in which the cargo platform 16 mates with conventional ground-based cargo-handling apparatus, such as a cart 18. The cargo platform 16 is movable between the channel members by means of the power drive unit 32 between its lowermost position and its highest position at the entrance to the cargo hold 19 in the aircraft, the highest position being shown in solid lines in FIG. 3. When cargo-handling operations are completed, the combination of the jury struts 24, 26, the channel members 20 and 22, with braces 28 and 30, and the cargo platform 16 is folded and rotated such that the combination may be completely stowed within the cargo hold 19 during flight, as shown by the alternating solid/dashed line position in FIG. 3.

Referring now more specifically to FIGS. 1 and 2, the opening 14 into the cargo hold of the aircraft 12 has an outline which is substantially rectangular, and conforms to the exterior shape of the aircraft. The outline of opening 14 includes two opposing sides 40, 42 which extend transversely of the aircraft, and a top 44 and bottom 46, which extend in the longitudinal direction of the aircraft. Positioned just inside the cargo hold opening 14 adjacent each side 40 and 42 thereof near the bottom 46 are structural supports (not shown) to which are secured channel support plates 48 and 50.

Each of the channel support plates 48 and 50 is multilateral in outline and have defined therein a plurality of holes drilled therethrough, to permit the channel support plates 48 and 50 to be rigidly secured to the structural supports (not shown) positioned just inside the cargo hold opening by means of bolts, rivets, or other similar well-known attachment means.

When so secured, the plates 48 and 50 extend substantially perpendicularly to the longitudinal axis of the aircraft and are positioned entirely within the cargo hold. Also defined in plates 48 and 50 is a substantially-sized hole for receiving a conventional pivot pin. In the preferred embodiment, the pivot pins are metal, approximately 1 inch in diameter, just slightly smaller than the diameter of the hole, and approximately 2 inches long. Pivot pins 54 and 56, which are positioned in channel support plates 48 and 50, respectively, extend perpendicularly to the channel support plates, parallel to the longitudinal axis of the airplane, and toward each other. The pivot pins 54 and 56 are secured to the holes defined in support plates 48 and 50 therefor, by conventional means such as pins, etc., such that they are freely rotatable in the plates without pulling out therefrom in operation. Pivot pins 54 and 56 extend outward from their respective channel support plates 48 and 50 approximately 1-½ inches, providing sufficient clearance between the platform 16 and the channel members, at which point they are rigidly secured as by welding, etc., to channel members 20 and 22, respectively, in the vicinity of one end thereof.

Channel members 20 and 22 are elongated elements having a U-shaped section and preferably made from high strength aluminum. In the preferred embodiment, they are of sufficient length to terminate approximately 20 inches above ground level in the deployed position. This permits the aircraft to shift position slightly on the ground without damaging the cargo-handling apparatus when it is deployed. In the preferred embodiment, when the apparatus is fully deployed, as shown in FIGS. 1 and 3, channel members 20 and 22 extend directly vertically downward from their connection to plates 48 and 50 through pivot pins 54 and 56. The channel members 20 and 22, when fully deployed, are spaced from each other, parallel one another, and are coplanar. They are arranged such that they open toward each other, with the respective opposing flanges 58 and 60 of each member being approximately 1 inch wide, and the web 62 being substantially 2 inches wide, as seen most clearly in FIG. 2. The pivot pins 54 and 56 are secured to the web 62 of each channel member near the top ends 59 thereof.

Extending between the channel members 20 and 22 in the preferred embodiment are a pair of elongated brace bars 28 and 30 located, respectively, at substantially the longitudinal midpoint 64 of the channel members, and near the end 66 of the channel members away from the top end 59. The brace bars 64 and 68 are high strength metal, approximately 1 inch by 1½ inches in cross-section, and are secured to the respective flanges 58 of channel members 20 and 22, without physically interfering with the U-shaped opening of the channel members.

Brace bars 64 and 66 are rigidly secured between the channel members 20 and 22 by means of welding, etc., to provide significant structural stability between the two channel members 20 and 22, resulting in a rigid unitary channel member assembly for the cargo-handling apparatus, such that the two channels are prevented from moving independently.

A cargo platform 16 is guided and positioned by channel members 20 and 22. The cargo platform 16 is of conventional configuration, being of sufficient size to adequately support a conventional cargo container, which is typically but not necessarily substantially 5 by 5 feet in outline. The cargo platform 16 is substantially 64 inches square in the preferred embodiment, configured such that it may be rotated as a unit through the opening 14. The cargo platform comprises a rectangular frame 68 into which is positioned a platform panel 71 which is conventionally constructed of an aluminum alloy in a honeycomb-type configuration, the panel 71 having a plurality of freely rotatable balls partially embedded therein, such that in operation the cargo container will rest on the uppermost exposed part of the rotatable balls, and is hence readily movable over the platform. Such a platform is known in the art as a ball transfer panel, and is conventional in design and structure. When fully deployed, as shown in FIG. 1, two sides 70 and 72 of the cargo platform 16 are generally parallel to the longitudinal axis of the aircraft, while the other two sides 74 and 76 are transverse thereto.

Extending from each of the transverse sides 74 and 76 of platform 16 in the vicinity of one end 78 thereof nearest the aircraft 12 are rollers 80 and 82. Roller 80, as an example (FIG. 2), is supported away from side 76 by pivot pin 84, with the pivot pin 84 being secured to transverse side 76 of cargo platform 16. Roller 80 is aligned and configured so as to fit within the opening defined by the U-shaped channel member 20. Rollers 80 and 82 thus may traverse within the U-shaped channel members 20 and 22 along the length thereof. The rollers 80 and 82 are supported by their associated pivot pins sufficiently away from the transverse sides 74, 76 of the cargo platform 16 such that when the rollers are positioned in the channel members, sides 58 and 60 of each channel member extend adjacent to, but do not come in contact with, transverse sides 74 and 76 of cargo platform 16. If otherwise properly supported, the cargo platform 16 is then free to move, guided by the rollers 80 and 82, in the channel members 20 and 22.

Pivotally connected to the longitudinal side 70 away from the aircraft are a pair of rotatable hooks 86 and 88. Hooks 86 and 88 are spaced equal distances in from the respective opposite ends of longitudinal side 70, and comprise straight bars having small vertical portions 87, 89 projecting upwardly at one end thereof when the straight bars are horizontally disposed. The other end 90, 91 of each bar is pivotally connected to the platform within small cutout portions which extend a relatively short distance inward of the platform from the longitudinal side 70. The pivot connection of the hooks to the platform includes conventional stop devices (not shown), such that the hooks 86 and 88 may be rigidly positioned at selective rotational positions. For instance, hooks 86 and 88, in the preferred embodiment, may be rigidly stopped when the bars are substantially coplanar with the cargo platform, with the portions 87 and 89 thus oriented vertically and upwardly from the platform. In this position, the hooks may be locked against further movement. Additionally, the pivot mechanism permits the hooks to be rotated clockwise and counterclockwise from its locked position, such that it may be rotated counterclockwise against the top of cargo platform 16.

When the hooks 86 and 88 are in their locked horizontal position, the size of the cargo platform is effectively increased for purposes of cargo-handling operations. Such a feature provides the cargo platform with the necessary size during cargo-handling operations, while allowing the actual dimensions of the platform to be such that it can be stowed within the aircraft when the hooks are down. Otherwise, the platform may be too large to be rotated through the opening 14 as a unit.

Providing the power to drive the unit is the conventional drive unit 32 which is secured to a support structure (not shown) within the aircraft cargo hold. Transmitting the driving power from the unit 32 are rotatable drive arms 92, 94, 96 and 98. Each of the drive arms may be rotated independently from the others. Positioned on the ends away from unit 32 of the drive arms are drive sprockets 100, 102, 104 and 106. Drive sprockets 100 and 102 are positioned so as to be very nearly vertically aligned with transverse side 76 of cargo platform 16, while drive sprockets 104 and 106 are very nearly vertically aligned with transverse side 74. Positioned inwardly of the aircraft on additional support structure (not shown) and substantially respectively coplanar with drive sprockets 100 and 102 are negators 108 and 110. A negator is a well-known device which functions to take up slack in a chain or similar device and maintains a constant tension thereon by means of a coiled spring arrangement within the negator housing. Each of the negators are supported within the cargo hold such that individual chains, which extend between the negators and their associated drive sprockets define substantially horizontal lines within the cargo hold. Thus, negator 108 is substantially vertically and horizontally coplanar with its associated drive sprocket 100, while negator 110 is likewise positioned in relation to drive sprocket 102. Similarly, negator 112 is likewise positioned with respect to drive sprocket 104, and negator 114 with drive sprocket 106.

Connection sites on cargo platform 16 for receiving a metal link-type drive chain are provided at two points on the upper surface 73 of platform frame 68 adjacent the two transverse sides 74 and 76. In the preferred embodiment, connections 124, 126 adjacent the transverse sides 74 and 76 are provided near the ends 79 thereof intersecting longitudinal side 70 while the other connections 128, 130 are provided approximately one foot in from ends 78 of transverse sides 74 and 76. Of course, it should be recognized that other connection sites may be provided on the cargo platform 16 without departing from the spirit of the present invention.

Individual drive chains 34, 35, 36 and 37 are provided to extend between each combination of negator, drive sprocket and platform connection site. Thus, drive chain 34 extends between negator 108 and connection site 124 over drive sprocket 100. Similar arrangements are provided for drive chains 35, 36 and 37. Since drive sprockets 100 and 102 are positioned adjacent one another, the portions of drive chains 116 and 118 from the drive sprockets to their associated connection sites on the cargo platform 16, being of substantially the same length, will define substantially a triangle in outline.

When the drive unit 32 is operative, and hence, one or more of drive arms 92, 94, 96, 98 are rotating, thereby driving drive sprockets 100, 102, 104 and 106, cargo platform 16 moves up or down, depending upon the direction of rotation of the drive sprockets. In moving down, of course, the weight of the platform itself is sufficient to unwind the drive chains from their associated negators, while the coiled spring action of the negators operates to take up the slack of the drive chains when the platform is moving up.

Referring to FIGS. 1 and 3, two jury struts 24 and 26 are provided which, when the apparatus is deployed, extend between channel members 20 and 22 and the body of the aircraft 12. The jury struts are preferably made from high strength aluminum, and in the preferred embodiment are approximately 1 inch in diameter, tubular in shape with a wall thickness of approximately one-tenth of an inch. The jury struts 24 and 26 are connected to their respective channel members 20 and 22 by means of conventional universal joint connections 59 to sides 58 of the channel members. As shown in FIG. 3, the connection is made at approximately the midpoint of the channel members, although other connection sites may provide the required rigidity for the combination of the channel members and the brace bars as well. The connection preferably provides a universal movement so that the jury struts may be freely rotated in order to facilitate ease of connection and disconnection with the body of the aircraft.

Referring to FIG. 3, the jury strut extends rearward from the channel members 20 and 22 to the body of the aircraft at substantially a 45° angle, where it is connected by means of a conventional male-female connection 61 to the aircraft body. Thus, matching connections to the jury struts are provided on the exterior of the aircraft itself. When connected to the aircraft, the jury struts 24 and 26 not only extend rearward of the channel members, toward the plane, as shown in FIG. 3, but inward of the channel assembly toward one another as well. This is shown to a degree by FIG. 1, with the angle away from the vertical, toward each other being approximately 30° in the preferred embodiment. This angle can, of course, be modified, depending on the configuration of the other portions of the apparatus, and the particular application of the load-handling apparatus.

In operation, the function of the rigid jury struts 24, 26 which connect the channel assembly to the aircraft, is to stabilize the channel assembly, which comprises channel members 20 and 22 and brace ends 64 and 66, from swinging or twisting as a unit. The cargo platform is then free to move up and down in the channel members without danger of having the channel assembly, and hence the cargo platform, become unstable due to swaying and twisting of the entire structure. The provision of jury struts is an essential feature of the apparatus, as the simplicity and cost attractiveness of the apparatus otherwise would be largely negated were it not stabilized and thus prevented from swaying or swinging during cargo-handling operations.

As mentioned briefly above, the operation of the cargo-handling apparatus is relatively simple. When deployed, the channel assembly comprising channel members 20 and 22 and brace bars 28 and 30 is substantially vertical, with the jury struts 24, 26 connecting the channel assembly to the aircraft 12. In loading, the cargo platform 16 is in its fully extended or lowest position at the very bottom of the channel members 20 and 22, as shown by dashed lines in FIG. 3. In such a case, the hooks 86 and 88 will be rotated downwardly, as shown, permitting a conventional ground-based cart shown generally at 18 to either abut the outer edge 76 of the cargo platform, or if of correct configuration, to fit between the hooks and slide beneath the cargo platform. The height of the channel members is such that the distance between the cargo platform 16 in its lowest position and the ground is substantially equal to the height of conventional cargo carts. Cargo positioned on the cart 18 may then be easily moved from the cart, which typically includes a roller-type platform, onto the cargo platform 16, where it is again easily positioned because of the transfer ball construction, as explained above. When the cargo is on the cargo platform 16, the hooks 86, 88 are raised to their horizontal locked position, as seen in solid lines in FIG. 1, with the hook portion operative to prevent roll-off of cargo from the cargo platform 16. Drive unit 32 is then energized, providing rotational movement to drive sprockets 100, 102, 104, and 106 through associated drive arms 92, 94, 96 and 98. As the drive arms 92, 94, 96 and 98 rotate counterclockwise for loading, the length of the portion of drive chains 34, 35, 36 and 37 extending between the drive sprockets 100, 102, 104 and 106 and their associated platform site connections 124, 126, 128 and 130 on cargo platform 16 decreases, with the slack in the chains between the drive sprockets and their associated negators being taken up by the spring driven negators.

In such a conventional fashion, the cargo platform 16 is gradually raised directly vertically, being guided by the rollers 80 and 82 sliding along in the U-shaped channel members 20 and 22 while the platform 16 and the cargo thereon is actually supported and moved by the drive unit acting on the drive chains. When the cargo platform 16 is substantially level with the bottom of cargo hold opening 14, the operator stops the drive unit and the cargo is then moved into the cargo hold. The loading operation continues until all of the cargo is loaded into the cargo area. When the cargo-handling operation is completed, the cargo-handling apparatus is folded and stowed inside the aircraft as shown in FIG. 4, permitting the cargo hold door 91 of the aircraft to be closed.

FIGS. 3 and 4 show the manner in which the entire cargo-handling apparatus is stowed conveniently within the hold with a minimum loss of usable cargo room. At the beginning of the stowing procedure, the cargo platform 16 should be in its fully raised position near the top of channel members 20 and 22. The jury struts 24 and 26 are first disconnected from the body of the aircraft 12, and swung counterclockwise until the jury struts 24 and 26 lie alongside their associated channel members 20 and 22, at which point the jury struts are secured to the channel members by means of a clip 133 or similar device provided on the channel members. The channel members 20 and 22 with the brace bars 64 and 66 and the secured jury struts 24 and 26 are then rotated about pivot pins 54 and 56, until the channel members 20 and 22 are substantially coplanar with the cargo platform 16, with the brace bars 64 and 66 thus extending just beneath the bottom of the cargo platform 16, such that said channel members may be secured to said cargo platform. At this point, the hooks 86 and 88 are rotated clockwise if they have not been so previously such that they rest against the top of the cargo platform 16. At this point, the combination of the jury struts, the channel assembly, and the cargo platform forms a relatively flat, almost planar package, ready to be further rotated about pivot pins 54 and 56 into the cargo hold.

It should be noted that the hooks 88 and 86 provide the additional necessary size of the platform to accommodate conventionally sized cargo containers, while in their stowed or rotated position permit the cargo platform 16 to be rotated within the conventionally sized cargo hold opening. At this point in the stowing procedure, the drive unit 32 selectively energizes drive arms 92 and 98, thereby rotating drive sprockets 100 and 106, such that drive chains 34 and 36 are pulled upward, thus rotating platform 16 further about pivot pins 54 and 56. Sprockets 102 and 104 are also briefly rotated so as to take up any slack in chains 35 and 37. The drive unit 32 is run until the entire load handling apparatus unit is rotated through the cargo hold opening 14. This is shown in elevation in FIG. 4. The cargo hold door 91 may then be closed and secured in the conventional manner, and the cargo-handling apparatus, which is now in the stowed position within the aircraft, may then be conveniently secured to a support beam in the cargo hold (not shown) by conventional clips (not shown) or other securing apparatus to prevent any unwanted or undesired movement of the apparatus in flight.

Thus, a cargo-handling apparatus for use with ground-based equipment such as carts has been disclosed, the apparatus being relatively simple to manufacture and to operate, and which is prevented from swaying and/or twisting during cargo-handling operations by means of a special configuration of elements disclosed and claimed herein. It should be recognized that the dimensions of the cargo-handling apparatus may be varied without departing from the spirit of the invention. Furthermore, it should be recognized that various means of actually powering the cargo-handling platform from a fully raised to a fully lowered position may be utilized, including by hand, again without departing from the spirit of the invention. Other changes, modifications and/or additions to the structure herein disclosed can also be accomplished without departing from the invention herein which is defined by the claims which follow.

What is claimed is:

1. A stowable cargo-handling apparatus for use in an aircraft to load and unload cargo comprising:
   a cargo platform movable vertically and pivotable about one edge thereof;
   frame means for supporting and guiding said cargo platform and engaging said platform at said one edge comprising a pair of channel members pivotally attached to said aircraft adjacent a cargo hold opening, said channel members movable from a cargo lifting position extending substantially vertically downward from the cargo hold opening to a stowed position by rotation thereof through said cargo hold opening;
   hoist means connected to said cargo platform by a first flexible lifting means engaging said one edge of said cargo platform and a second flexible lifting means engaging another edge of said cargo platform, said hoist means operable to move said cargo platform from a position adjacent the ground to a position adjacent said cargo hold opening by simultaneous upward movement of said first and said second flexible lifting means and operable to rotate said cargo platform from said position adjacent said cargo hold to a stowed position within said aircraft by further upward movement of said second flexible lifting means.

2. The apparatus of claim 1, wherein said first and second lifting means comprise link chains.

3. The apparatus of claim 1, wherein said first and second lifting means are flexible members passing around and operatively engaging rotatable drive means, slack in portions of said lifting means passing said drive means being taken up by negators.

4. The apparatus of claim 1 and a pair of rigid struts, one of said struts extending from each channel member to said aircraft to stabilize said channel member against movement during cargo moving operations.

5. The apparatus of claim 1, wherein said guiding means includes two spaced, coplanar channel members, said cargo platform being positioned between said two channel members and including projection means secured thereto and positionable in said channel members to facilitate movement of said cargo platform therealong.

6. The apparatus of claim 5, wherein said projection means are rollers, which rollers mate with said channel members to guide said cargo platform as it is moved between the cargo hold opening and said termination point, said rollers being positioned on opposite sides of said platform adjacent one end thereof.

7. The apparatus of claim 5, including bracing means extending between and rigidly interconnecting said spaced channel members.

8. The apparatus of claim 7, wherein said bracing means includes at least two elongated bars, extending perpendicularly between said spaced channel members, one of said bars being connected to said channel members adjacent the terminal end thereof.

9. The apparatus of claim 4, wherein said rigid struts are slanted toward one another from said channel members.

10. The apparatus of claim 4, wherein each of said rigid struts is connected to one channel member by means of a universal connection.

11. The apparatus of claim 10, wherein said rigid struts extend rearward of the channel members to the aircraft at an angle on the order of 45°.

12. An apparatus of claim 9, wherein said rigid struts are splayed toward one another from the channel members at an angle substantially on the order of 30° from the vertical.

13. The apparatus of claim 4, including clip means positioned in the vicinity of the terminal end of said channel members, said rigid struts adapted to be secured to said channel means by said clip means.

14. The apparatus of claim 1, wherein said cargo platform is multilateral in outline, and includes at least two sides which are generally parallel with the longitudinal axis of the aircraft, one of said parallel sides being nearer to the aircraft than the other, the other parallel side having two rotatable hooks connected thereto at spaced points therealong, said hooks being rotatable about said connection points, and including means for stopping said hooks such that they are parallel with said cargo platform.

* * * * *